(12) United States Patent
Ehrfeld et al.

(10) Patent No.: US 7,827,871 B2
(45) Date of Patent: Nov. 9, 2010

(54) ANTIFRICTION BEARING PROVIDED WITH POLYMER ELECTRONICS

(75) Inventors: Wolfgang Ehrfeld, Wendelsheim (DE); Frank Herbstritt, Alzey (DE); Joachim Hering, Würzburg (DE)

(73) Assignee: Schaeffler KG (DE)

(*) Notice: Subject to any disclaimer, the term of this patent is extended or adjusted under 35 U.S.C. 154(b) by 896 days.

(21) Appl. No.: 10/558,221

(22) PCT Filed: May 26, 2004

(86) PCT No.: PCT/DE2004/001099
§ 371 (c)(1),
(2), (4) Date: Mar. 27, 2007

(87) PCT Pub. No.: WO2004/106878
PCT Pub. Date: Dec. 9, 2004

(65) Prior Publication Data
US 2007/0277612 A1 Dec. 6, 2007

(30) Foreign Application Priority Data
May 27, 2003 (DE) ............... 103 23 889

(51) Int. Cl.
*G01L 3/14* (2006.01)
(52) U.S. Cl. ............................................. 73/862.322
(58) Field of Classification Search ............. 73/862.322
See application file for complete search history.

(56) References Cited

U.S. PATENT DOCUMENTS

| | | | |
|---|---|---|---|
| 5,677,488 A | 10/1997 | Monahan et al. | |
| 6,855,214 B2* | 2/2005 | Obara et al. | 148/325 |
| 6,926,445 B2* | 8/2005 | Sato et al. | 384/448 |
| 6,948,856 B2* | 9/2005 | Takizawa et al. | 384/448 |
| 7,341,321 B2* | 3/2008 | Takahashi et al. | 303/168 |
| 7,429,133 B2* | 9/2008 | Gallion et al. | 384/448 |
| 7,568,842 B2* | 8/2009 | Gempper et al. | 384/448 |
| 7,591,194 B2* | 9/2009 | Pecher et al. | 73/862.322 |

FOREIGN PATENT DOCUMENTS

| | | |
|---|---|---|
| DE | 4218949 | 12/1993 |
| DE | 10136438 | 3/2002 |

(Continued)

OTHER PUBLICATIONS

International Search Report for PCT/DE2004/001099 dated Sep. 23, 2004.

(Continued)

*Primary Examiner* — Lisa M Caputo
*Assistant Examiner* — Octavia Davis
(74) *Attorney, Agent, or Firm* — Ostrolenk Faber LLP

(57) ABSTRACT

An antifriction bearing provided with sensors for recording physical quantities that act upon the hearing and with strip conductors and electronic components for evaluating and/or transmitting sensor output signals or characteristic values derived therefrom to electrical or electronic devices located outside of the bearing. To this end, the sensors, strip conductors and electronic components are placed on at least one bearing part while forming a measurement data recording and/or measurement data processing system. The sensors, strip conductors and/or electronic components are made from at least one electrically conductive or semiconducting organic material.

30 Claims, 2 Drawing Sheets

FOREIGN PATENT DOCUMENTS

DE    10061923    6/2002

OTHER PUBLICATIONS

Huebler A. et al., "High volume printing technologies for the production of polymer electronic structures" dated Jun. 2002.

Cantatore E. et al "Polymer electronics: from discrete transistors to integrated circuits and active matnx displays" dated Sep. 2002.

Hofstraat H., "Will polymer electronics change the electronics industry?" dated Oct. 2001.

Taylor D.M. et al., "Engineering challenges for polymer electronics" dated Nov. 2001.

McCluskey P. et al., "Nanocomposite materials offer higher conductivity and flexibility" dated Sep. 1998.

Gardner J.W. et al., "Application of conducting polymer technology in microsystems" dated Oct. 1995.

Lee E.H. et al. "Super-hard-surfaced Polymers by High-energy Ion-beam Irradiation" dated Jul. 1996.

* cited by examiner

ANTIFRICTION BEARING PROVIDED WITH POLYMER ELECTRONICS

CROSS REFERENCE TO RELATED APPLICATION

The present application is a 35 U.S.C. §§371 national phase conversion of PCT/DE2004/001099, filed 26 May 2004, which claims priority of German Application No. 103 23 889.1, filed 27 May 2003. The PCT International Application was published in the German language.

FIELD OF APPLICATION OF THE INVENTION

The invention relates to an antifriction bearing, provided with sensors for recording physical quantities acting on the bearing and with electronic parts for evaluating and/or transmitting the sensor output signals or characteristic values derived therefrom to electrical or electronic devices located outside the bearing. The sensors, strip conductors and electronic parts are arranged on at least one bearing part, thereby forming a measurement data recording and/or measurement data processing system. The invention also relates to a relevant production method and production machine.

BACKGROUND OF THE INVENTION

DE 101 36 438 A1 discloses a sensor arrangement in an antifriction bearing with which physical quantities acting on the bearing can be determined. In the case of this sensor arrangement, the forces and moments acting on bearing shells of the antifriction bearing are recorded in such a way that the mechanical stresses or other physical influences on the bearing shells are detected by sensor elements arranged on the bearing shells and electronic parts optionally combined with them. The sensors are in this case formed as strain gages, which are preferably fastened in a peripheral groove of a fixed bearing shell. It is possible for the shell to be both the inner bearing shell or the outer bearing shell of an antifriction bearing.

According to this publication, the sensor arrangement may be arranged on a substrate acting as a carrier material. Moreover, the resistive strain gages of the sensors described above are applied over an insulating layer on an inflexible metal intermediate carrier, such as for instance a small plate. According to this publication, the carrier material, formed as a leadframe, may be welded onto or pressed into the antifriction bearing at a suitable location.

In addition, it is known from this DE 101 36 438 A1 that both axially measuring and tangentially measuring resistive strain gages in full-bridge or half-bridge connection can be applied to the metal intermediate carrier. Moreover, these known bridge circuits may also be connected to electronic devices with which signal evaluation and signal transmission to further measuring points or other evaluation circuits or to a connection plug is possible.

The signal transmission in the case of this known measuring bearing may take place serially via a digital bus or an analog bus. Accordingly, this mechatronic arrangement allows the additional direct assignment of devices for electronic signal processing to the antifriction bearing, so that for example digital output signals can be generated and the sensor arrangement can be connected directly to a bus system, for instance in a motor vehicle.

Furthermore, DE 42 18 949 A discloses a force measuring bearing in which the sensors take the form of force measuring films and are inserted in a peripheral groove of a bearing part. These film sensors comprise two laminated-together layers of polymer, one layer being coated with electrodes engaging in one another in a comb-like manner and a resistance material being applied to the other layer. If a force is applied to the sensor, the resistance material closes the electrodes more or less in parallel, so that the electrical resistance decreases with increasing pressure loading. This pressure-dependent change in resistance can then be precisely determined with the aid of evaluation electronics.

Furthermore, DE 103 04 592.9, which is not a prior publication, discloses an antifriction bearing of the generic type with a measurement data recording and/or measurement data processing system which comprises sensors, strip conductors and microcomputers which are arranged on at least one common flexible carrier film and are fastened on a part of the bearing.

In the case of this antifriction bearing, the sensors and electronic devices together with their flexible carrier film are fastened for example on the fixed outer bearing race, and preferably fastened there in an annular groove on the outer side of the bearing race.

With regard to the sensors, which in this measurement data recording and measurement data processing system are integrated on the flexible carrier film, it is provided that they are formed at least for recording the rotational speed and/or the direction of rotation of a body mounted in the bearing, the radial and/or axial force acting on the bearing, the direction of the force, the noise of the bearing, the temperature of the bearing and any unbalance that may occur.

According to this prior art, the electronic devices may be built up as individual discrete electronic devices or else as complex and very small microcomputers, which are connected to the sensors and also to one another via signal transmission lines on the flexible carrier film. The sensors, the sensor lines and/or data lines and the electronic devices are applied to the flexible carrier film for example by means of a thin-film method (PVD method) or by means of a sputtering technique and are covered with an elastic and electrically nonconducting covering material.

Finally, it is known from DE 42 31 610 A1 and the publications US 2003/59975 A1, US 2003/59984 A1, US 2003/59987 A1 and US 2003/60038 A1 to use an organic material for the production of electronic structures and to apply this to a carrier substrate for example by means of liquid-jet printing (ink-jet printing).

OBJECT OF THE INVENTION

Against this background, the object of the invention is to provide a measuring bearing of the generic type which, with regard to the production and arrangement of the electronic parts and components, can be produced at lower cost, with better quality and with greater flexibility than before.

Solution Achieving the Object

The solution achieving this object is obtained for the measuring bearing using a production method to create such a measuring bearing operated by a relevant production machine.

Accordingly, the antifriction bearing is provided with sensors for recording physical quantities acting on the bearing and with electronic components for evaluating and/or transmitting the sensor output signals or characteristic values derived therefrom to electrical or electronic devices located outside the bearing, the sensors, strip conductors and electronic components being arranged on at least one bearing part, thereby forming a measurement data recording and/or measurement data processing system. It is then of special importance with regard to the invention that the sensors, strip conductors and/or electronic components are built up from at least one laterally structured, electrically conducting or semiconducting organic material or a precursor thereof.

In a preferred refinement of the invention, it is provided that the electrically conducting or semiconducting organic material or its precursor is printed on the at least one bearing part by printing techniques and/or coating techniques from a liquid or solid phase of the organic material.

By being constructed in this way, such a measuring bearing can be produced very quickly, at low cost and very advantageously with regard to product variability and measuring accuracy. This is attributable to the fact that the sensors, strip conductors and/or other electronic components made from at least one electrically conducting or semiconducting organic material can be applied directly to the surface of the bearing part or parts concerned, which may optionally even be curved, by means of printing, liquid-phase and/or solid-phase coating methods without complex and expensive vacuum or carrier-gas production processes and/or the use of additional adhesives or other fastening means being necessary.

Apart from being made easier to produce in this way, the direct contact between the sensors and the bearing parts also improves the measuring accuracy in comparison with an adhesively attached bearing sensor.

For the production of signal transmission lines, electrical coils and electrical resistors, intrinsically electrically conducting or semiconducting organic material is used with preference, such as for instance doped polyacetylene, polyphenylene vinylene, polyaniline or polyethylene dioxythiophene.

These polymers do not necessarily have to be soluble polymers. Many intrinsically conductive polymers are not deposited from a solution but from a colloidal dispersion. Moreover, it is conceivable for suitable materials to be deposited from a dissolved or dispersed precursor phase of said organic printing material, which is transformed by a subsequent treatment, for example heating or UV irradiation, into a semiconducting or conducting polymer phase and, in the final state, no longer necessarily has to be soluble.

Furthermore, there is the possibility of transferring the electrically conducting or semiconducting structures from an intermediate carrier onto the carrier substrate of the electronics by means of a thermal transfer method.

Another production variant is seen in application of the conducting or semiconducting structures to the bearing part by means of the so-called laser induced thermal imaging method (described in: U.S. Pat. Nos. 5,521,035; 6,114,088; 6,242,140 and 6,194,119). In this case, the material is transferred to the bearing part in the solid state from a carrier in a laterally structured form.

In another refinement of the invention, the signal transmission lines, electrical coils and electrical resistors may also be formed from extrinsically electrically conducting or semiconducting organic material, including for example graphite-filled or metal-filled polymer pastes.

In a development of the measuring bearing according to the invention, field-effect transistors and/or diodes are formed with regard to their semiconductor structures for example from poly(3-alkylthiophene), $\alpha$, $\omega$-dihexylsexithiophene, alkyl-naphthalene bisimide and/or fluoroalkyl-naphthalene bisimide, while a dielectric for such electronic devices may be formed from poly(methylmethacrylate), poly(vinylphenol) or polyimide.

With regard to the sensors integrated in the measuring bearing (in particular force and/or strain sensors), it is regarded as advantageous if they are formed as piezoresistively or piezoelectrically operating sensors. To build up piezoelectric sensors, components of polyvinylidene fluoride or of copolymers of vinylidene fluoride with trifluoroethylene can advantageously be used.

In another variant, the piezoelectrically operating sensors or components may also comprise composites of inorganic microcrystallites in polymeric layers, it being possible for lead zirconate titanate or $BaTiO_3$ to be contained in the polymer as the piezoelectrically effective component.

In the case of the measuring bearing constructed according to the invention, electrical capacitors are built up for example from the intrinsically or extrinsically conducting polymer pastes and polymeric dielectrics.

In the case of such a measuring antifriction bearing, in a refinement of the invention the sensors, strip conductors and electronic components are generally arranged on the inner bearing race or on the outer bearing race. With preference, the sensors and electronic components are placed there in a depression, such as for instance an annular groove, on the outer side or inner side of a fixed inner bearing race.

A measuring bearing constructed according to the invention preferably comprises sensors for recording the rotational speed and/or the direction of rotation of a body mounted in the bearing, the radial and axial force acting on the bearing, the direction of the force, the noise of the bearing or the vibrations that can be measured there, the temperature of the bearing and any unbalance that may occur.

In addition, the measuring bearing may be constructed in such a way that the electronic components made from at least one electrically conducting or semiconducting organic material comprise and/or form at least one microcomputer, which microcomputers are connected to other electronic devices and/or to the sensors via signal transmission lines, which are preferably located on the same bearing part.

If necessary for the recording and processing of very large amounts of sensor data and/or for the preprocessing of these data, it is also possible for a number of microcomputers to be arranged on the one bearing part or on a further bearing part. These microcomputers are then connected to one another via data lines, preferably made from an electrically conducting or semiconducting organic material, for the exchange of digital or analog data or signals.

For passing on the values recorded or formed by the sensors and/or electronic components, they have at least one connection point for passing on measuring signals, raw data and/or prepared information on the current physical state of the bearing and/or the part connected to the bearing to at least one separate display, data storage and/or data processing device located outside the bearing.

In another preferred embodiment of the measuring bearing formed according to the invention, the sensors, the sensor lines and data lines and the electronic components or the microprocessors have been applied to the bearing part or parts in a common production process, so that they preferably form a closed sheet-like structure made from the electrically conducting and or semiconducting organic material or materials.

In a refinement of the invention, for protection against external influences, the sensors, the sensor lines and data lines and the electronic components or the microcomputers are coated with a flexible and electrically nonconductive covering material, which likewise consists of an electrically insulating material.

Another variant of the invention provides that the at least one bearing part has applied to it a logical electronic circuit comprising semiconductor structures on the basis of conventional semiconductor technology, while further electronic structures belonging to this circuit, consisting of at least one electrically conducting or semiconducting organic material, are preferably printed onto the bearing part.

To build up a very complex measuring and evaluating device, the sensors, sensor lines and data lines and the electronic components or the microcomputers may be arranged on one of said bearing parts in different planes with an insulating layer interposed. For the electrically conducting connection between the strip conductors and/or electronic components arranged in different planes, in a refinement of the invention contacts (contact vias) made from electrically conducting or semiconducting organic material aligned substantially perpendicular to the longitudinal extent of the strip conductors are led through the aforementioned insulating layer.

In addition, it is regarded as advisable if, to avoid electrical contacting between the surface of the at least one bearing part and the strip conductors, electronic components, microcomputers and/or sensors, an insulating layer consisting of a suitable organic or inorganic (for example oxidic) material is formed.

Finally, the measuring bearing may also have an optically operating transmitting device, which is produced from an electrically conducting or semiconducting organic material and is suitable and intended for the transmission of sensor signals and/or quantities derived therefrom from a bearing part to a part located outside the bearing. In another variant, however, wireless transmission by means of higher-frequency radio waves is also possible.

The production method according to the invention for creating an antifriction bearing with sensors for recording physical quantities acting on the bearing and with electronic components for evaluating and/or transmitting the sensor output signals or characteristic values derived therefrom to electrical or electronic devices located outside the bearing, in which the sensors, strip conductors and electronic components are arranged on at least one bearing part, thereby forming a measurement data recording and/or measurement data processing system, is therefore characterized in that the sensors, strip conductors and electronic components are built up on the surface of at least one part of the antifriction bearing from at least one electrically conducting or semiconducting organic material or its precursor.

This procedure has the great advantage over the known techniques that the sensors and (quite generally defined) electronic structures can be formed very easily and quickly on any desired structure of a part, without for example vacuum techniques being required for this. This not only reduces the production costs for such a measuring bearing; rather, the main benefit is that the sensor and electronic structures can be arranged or built up without any problem and in a space-saving way even on greatly curved or structured surfaces of a part.

With regard to the application of the electrically conducting or semiconducting organic material to the surface of at least one of the bearing parts, printing techniques are preferred. Therefore, the sensors, strip conductors and electronic components can be built up on the surface of the bearing part layer by layer, for instance by means of screen printing, flexographic printing or indirect gravure printing.

In another variant, comparable results are also achieved, however, by the sensor structures and electronic structures also being printed onto the surface of the at least one bearing part by a liquid-jet printing method (also known as ink-jet printing) by means of a liquid and an electrically conducting or semiconducting organic material dissolved or dispersed in it.

Moreover, it is possible for the sensors, strip conductors and electronic components to be formed on the surface of the at least one bearing part by means of a combination of screen printing and liquid-jet printing.

Furthermore, it is proposed that the sensors, strip conductors and electronic components are created by surface-area application of the electrically conducting or semiconducting organic material or its precursor in dissolved or dispersed form onto the bearing parts and subsequent lateral structuring by means of direct lithography or laser ablation.

Moreover, the sensors, strip conductors and/or electronic components can be transferred from an intermediate carrier to the carrier substrate of the electronics, or directly to a bearing part, by means of a thermal transfer printing method.

Another development of the method according to the invention provides that the sensors, strip conductors and/or electronic components are built up on the bearing part by means of the so-called laser induced thermal imaging method, in which the organic material, applied to a carrier film and in a solid state, is transferred from said film to the bearing part in a laterally structured form.

If the bearing part carrying the sensors, strip conductors and electronic components consists of an electrically conducting material, before the polymer electronics are built up, an insulating layer of a suitable, for example inorganic, material is preferably applied between this part and the polymer electronics, which creates an adequate insulating effect.

In a further refinement of the production method according to the invention, it is provided that at least one bearing part has applied to it a logical electronic circuit comprising semiconductor structures on the basis of conventional semiconductor technology (for example on the basis of silicon), and that subsequently the electronic structures belonging to this circuit, consisting of at least one electrically conducting or semiconducting organic material, are preferably printed onto the bearing part. Such a combined building-up technique allows the advantageous properties both of conventional semiconductor technology and of polymer electronics to be used.

Another variant of the inventive production method provides that the electronic circuit and/or individual sensors made from electrically conducting or semiconducting organic material are first printed onto a flexible film, subsequently singulated and finally fastened in a predetermined configuration on the at least one bearing part and electrically connected to one another.

Finally, it may be provided according to the method that the sensors, strip conductors and/or electronic components that are not arranged in one plane and are separated from one another by an insulator are electrically connected to one another by an electrically conducting or semiconducting organic material, this electrically conducting or semiconducting organic material being aligned substantially perpendicular to the longitudinal extent of the strip conductors or the electronic components.

The invention also relates to a production machine for producing sensors, strip conductors and/or electronic components from at least one electrically conducting or semiconducting organic material (polymer electronics) on an antifriction bearing, with a chucking device for that part of the antifriction bearing to which the polymer electronics are to be applied, with at least one feeding device for the feeding of the organic printing material or a precursor of the same, and with at least one printing device, which is connected to the feeding device and makes it possible for the printing material or its precursor to be applied to the part of the antifriction bearing layer by layer.

If the printing material is an electrically conducting or semiconducting organic printing material dissolved in a solution or dispersed in a liquid, the feeding device for the printing material is formed as a liquid line, through which the organic printing material can be transported to the printing device.

In the last-mentioned refinement of the production machine, the liquid printing device is formed in one embodiment as a screen printing, flexographic printing or gravure printing device, while in the case of a construction that is in fact preferred, the liquid printing device is formed as a liquid-jet printing head, to which the at least one line for supplying electrically conducting or semiconducting organic material is fastened.

The actuation of such a liquid-jet printing head preferably takes place by at least one piezoelectric actuator.

If the production machine is used for forming the polymer electronics on the bearing part by a gravure printing or flexographic printing method, it is possible to dispense with an aforementioned liquid line. Instead of this, suitable feeding devices for the gravure or flexographic printing agent are then provided on the production machine.

BRIEF DESCRIPTION OF THE DRAWINGS

The invention can be explained on the basis of actual exemplary embodiments and with the aid of the accompanying drawings, in which.

DETAILED DESCRIPTION OF THE DRAWINGS

Figure 1:
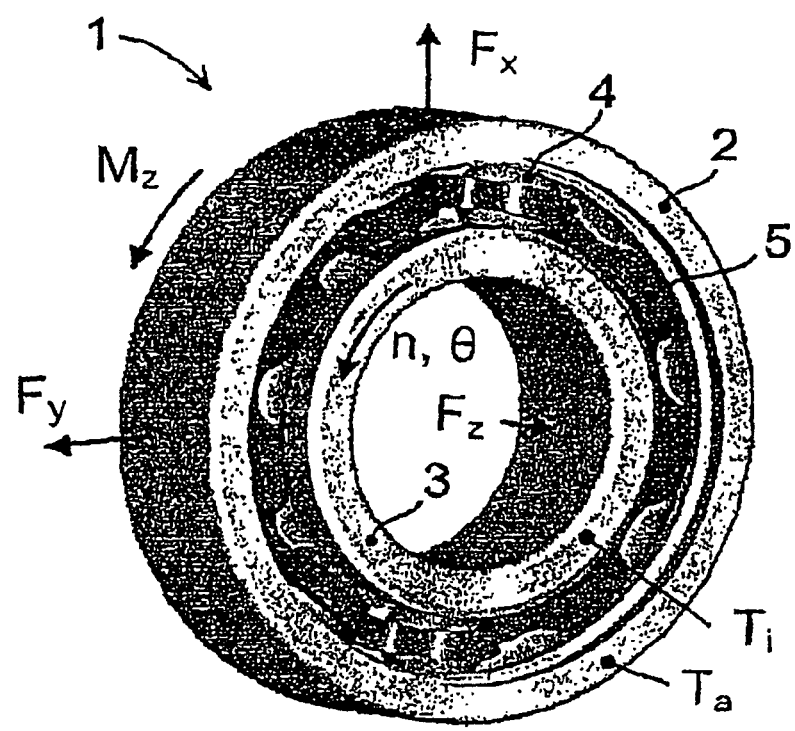
FIG. 1 shows an antifriction bearing and physical quantities that can be recorded from it.

Accordingly represented in a perspective view in FIG. 1 is a typical antifriction bearing 1, which includes an outer race 2, arranged in a rotationally fixed manner, and an inner race 3, mounted rotatably therein. Arranged between the outer race 2 and the inner race 3 are rolling bodies 4 formed as balls, which are enclosed in a ball cage 5.

A load mounted in the inner race 3, but not represented here, exerts on the antifriction bearing 1 forces $F_x$, $F_y$, $F_z$ in all three spatial coordinates, which can be measured by means of the sensors mentioned in the description of the prior art. It is also represented here that, inter alia, the rotational speed n and the angle of rotation $\theta$ of the inner race 3, the temperature $T_i$, $T_a$ of the inner race 3 and the outer race 2 and the axial torque $M_z$ can be established by means of suitable sensors.

Figure 2:
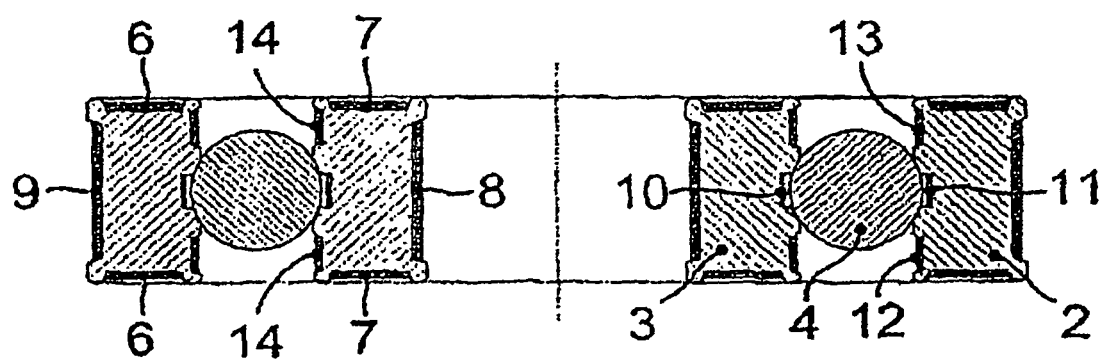
FIG. 2 shows a cross section through the antifriction bearing according to FIG. 1.

As revealed by the cross section through the antifriction bearing according to FIG. 1 that is represented in FIG. 2, the sensors for measuring the aforementioned or other physical quantities may be arranged at different locations in the antifriction bearing 1. The position at which they are fastened depends in some cases on the measuring method chosen and/or the physical/technical boundary conditions of the bearing and its installation situation, for example in a machine or a vehicle.

The production method according to the invention allows the sensors and the electronic structures, such as for example strip conductors, amplifiers, resistors, capacitors and also entire microcomputers, to be formed directly at a wide variety of positions both on the outer bearing race and on the inner bearing race. As FIG. 2 illustrates, sensors of this type and polymer electronic structures 6, 7, 8, 9, 10, 11, 12, 13, 14 may be incorporated both in axial grooves and in radial grooves of the inner race 2 and the outer race 3. However, it is also possible for the sensors and polymer electronic structures 6, 7, 8, 9, 10, 11, 12, 13, 14 also to be applied to regions of bearing parts that are not protected by grooves, it being quite possible even for more highly structured regions to be used as the place of attachment.

Of particular advantage in the case of the production method according to the invention is that the sensors and the polymer electronic structures are built up on the surface of at least one part of the antifriction bearing from at least one electrically conducting or semiconducting organic material.

This building-up process preferably takes place by a printing method, such as a screen printing or liquid-jet printing method, in which the electrically conducting or semiconducting organic material dissolved or dispersed in a liquid or a precursor of the same is printed directly onto the surface of the bearing part. Moreover, as already mentioned, the build-up of the polymer electronic structures may also take place by means of an indirect gravure or flexographic printing method.

If the bearing part consists of an electrically conducting organic material, however, it is recommendable to interpose an insulating layer irrespective of the printing method.

By contrast with the sputtering technique, for example, by this method the desired sensors and electronic structures can be very advantageously formed even on the curved radial surfaces of bearing races. In particular, unlike in the case of the sputtering technique, for this purpose the bearing parts do not usually have to be brought into a vacuum. Moreover, by analogy with the known ink printing heads of computer printers, with the liquid-jet printing method mentioned it is possible for different dissolved or dispersed electrically conducting or semiconducting organic materials to be sprayed simultaneously onto the part, so that the polymeric electronic structures can be produced very efficiently.

In addition, a production machine equipped with such a liquid printing head, controlled by a production computer and electronic layout plans, can print the same or different polymer electronics onto different types of bearing with a high degree of flexibility.

Further advantages can be seen in the high level of acceptance that such polymer electronics would meet on account of low raw material costs and their environmental compatibility.

Figure 3:
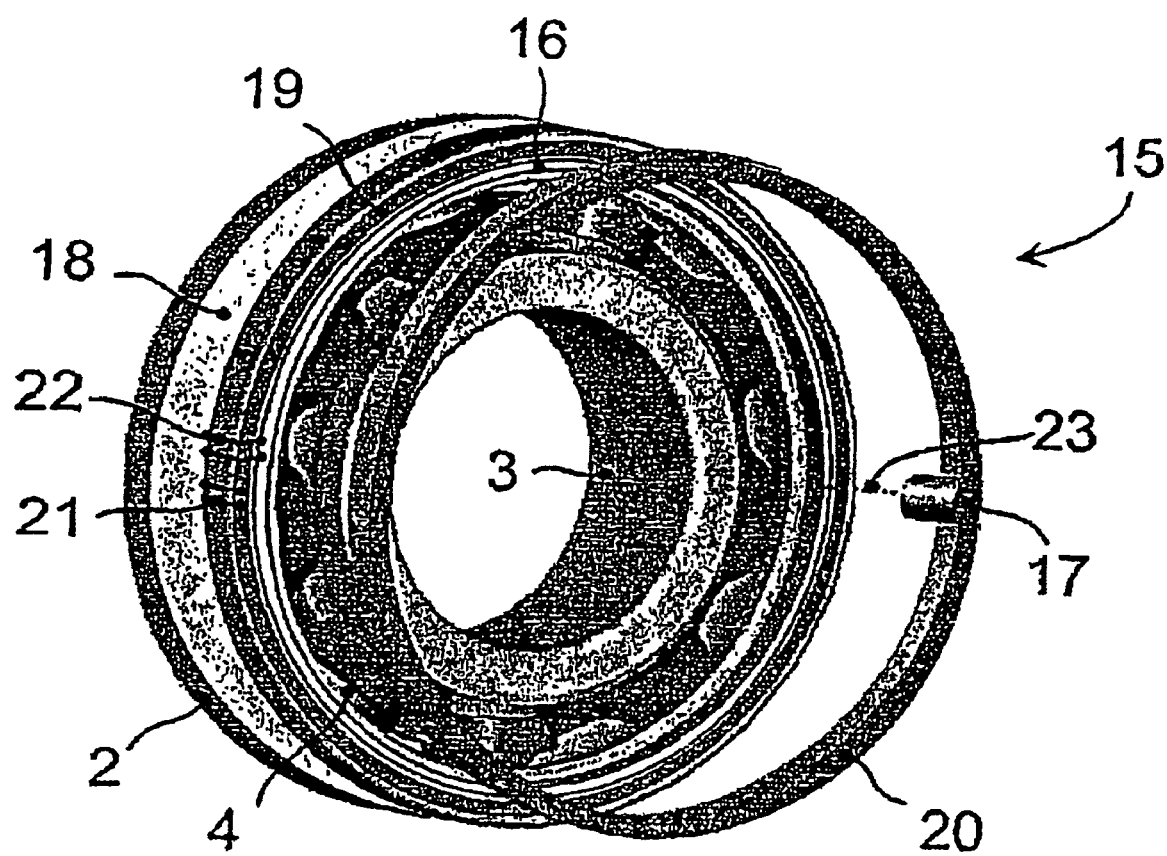
FIG. 3 shows a measuring antifriction bearing formed according to the invention, with an optical data transmission device.

In the case of the measuring antifriction bearing 15 formed according to the invention that is represented in FIG. 3, the sensors and other electronic structures are incorporated as integral polymer electronics 18 by one of the mentioned printing methods in a radial groove on the outer side of an outer bearing race 2 mounted rotatably on the inner bearing race 3. The build-up of these polymer electronics 18 thereby took place layer by layer, as known from conventional semiconductor technology, in which all the required sensor and/or electronic parts, such as resistors, capacitors, amplifiers and even entire microcomputers, can be created by series of layers of organic materials with different electrical properties.

As also revealed by FIG. 3, the information generated or processed by the polymer electronics 18 in the rotating system is passed on via sensor lines and/or data lines 22 to an optically operating transmitting device (organic light-emitting diode) 16, which is formed here in an annular manner and from an electrically conducting or semiconducting organic material.

This optically operating transmission device 16 transmits over a light path 23 the data stream generated by the polymer electronics 18 to a receiving photodiode 17, which is arranged on a fixed bearing part (not represented here) or, in the very compact form of construction shown here, on a fixed electrical excitation coil 20. However, transmission by means of a conventional radio device in the higher-frequency range is also not ruled out.

By means of the excitation coil 20, an electric current for supplying the polymer electronics 18 can be inductively coupled into a secondary coil 19 on the outer bearing race 2, and can be passed on from there via power supply lines 21 to the electronic components.

Of particularly great importance with regard to the invention described is the use of printing techniques to create a measuring bearing. The printing techniques that can be used for this, such as the liquid printing techniques, screen printing, ink-jet printing, flexographic printing and indirect gravure printing, and also the surface-area liquid-phase coating techniques with subsequent lateral structuring, such as for instance direct lithography or laser ablation, are particularly advantageously suited for this.

The invention claimed is:

1. An antifriction bearing including
bearing parts;
sensors for recording physical quantities acting on the bearing; and
electronic components for at least one of evaluating and transmitting output signals from the sensors or characteristic values derived from the output signals to electrical or electronic devices located outside the bearing;
the sensors, and the electronic components being arranged on at least one of the bearing parts, for forming at least one of a measurement data recording system and a measurement data processing system;
each of the sensors, and the electronic components on at least one bearing part being built up from at least one of a structured, an electrically conducting or a semiconducting organic material or a precursor of the organic material;
the antifriction bearing further comprising strip conductors also arranged on at least one of the bearing parts, the strip conductors being between at least some of the sensors and the electronic components and between some of the components.

2. The antifriction bearing as claimed in claim 1, wherein the electrically conducting material, or the semiconducting organic material or the precursor thereof is applied to the at least one bearing part by at least one of a printing technique and a coating technique from a liquid or solid phase.

3. The antifriction bearing as claimed in claim 2, wherein the strip conductors and the electronic components comprising electrical coils and electrical resistors are comprised of intrinsically conductive electrically conducting or semiconducting organic material.

4. The antifriction bearing as claimed in claim 2, wherein the strip conductors and the electronic components comprising electrical coils and electrical resistors are formed from extrinsically conductive electrically conducting or from semiconducting organic material.

5. The antifriction bearing as claimed in claim 2, wherein the electronic components comprise at least one of field-effect transistors and diodes and are formed with semiconductor structures from at least one of poly(3-alkylthiophene), α, ω-dihexylsexithiophene, alkyl-naphthalene bisimide and fluoroalkyl-naphthalene bisimide, and a dielectric formed from poly(methylmethacrylate), poly(vinylphenol) or polyimide.

6. The antifriction bearing as claimed in claim 2, wherein the sensors and the electronic components comprise piezoelectrically or piezoresistively operating sensors or components and are formed from polyvinylidene fluoride or from copolymers of vinylidene fluoride with trifluoroethylene.

7. The antifriction bearing as claimed in claim 2, wherein the sensors and the electronic components comprise piezoelectrically operating sensors and the electronic components comprise composites of inorganic microcrystallites in polymeric layers, lead zirconate titanate or BaTiO3 being contained in the polymer as the piezoelectric component.

8. The antifriction bearing as claimed in claim 1, wherein the electronic components comprise capacitors comprised of intrinsically or extrinsically conducting polymer pastes and polymeric dielectrics.

9. The antifriction bearing as claimed in claim 1, wherein the bearing parts include an inner ring with an inner bearing race, and outer ring with an outer bearing race and bearing rolling elements between the inner and the outer races; and the sensors, strip conductors and electronic components are arranged on at least one of the inner bearing race and the outer bearing race.

10. The antifriction bearing as claimed in claim 9, further comprising depressions in at least one of the inner and the outer bearing races; and the sensors, strip conductors and electronic components are arranged in the depressions in the at least one of the inner bearing race and the outer bearing race.

11. The antifriction bearing as claimed in claim 1, wherein the sensors are formed and operable for recording at least one of a rotational speed and a direction of rotation of a body which is mounted in the bearing, a radial and axial force acting on the bearing, a direction of force on the bearing, a noise produced by the bearing, a temperature of the bearing and any unbalance.

12. The antifriction bearing as claimed in claim 1, wherein the electronic components comprise or form at least one microcomputer, signal transmission lines arranged on the bearing part connecting the at least one microcomputer to at least one of other electronic devices and to the sensors.

13. The antifriction bearing as claimed in claim 1, further comprising a plurality of microcomputers arranged on the bearing part and data lines comprised of an electrically conducting or semiconducting organic material connecting the microcomputers to one another via which an analog or digital data exchange can take place.

14. The antifriction bearing as claimed in claim 13, wherein the sensors, sensor lines and data lines and the electronic components or the microcomputers have been applied to respective ones of the bearing parts in a common production process.

15. The antifriction bearing as claimed in claim 13, wherein the sensors, sensor lines and data lines and the electronic components or the microcomputers are coated with a flexible and electrically nonconductive covering material.

16. The antifriction bearing as claimed in claim 1, wherein at least one of the sensors or electronic components has a connection point, and the sensors and electronic components can be connected to at least one separate display by the connection point, at least one of a data storage and a data processing device being located outside the bearing for passing on at least one of raw data and prepared information on the current physical state of at least one of the bearing and an element connected to the bearing.

17. The antifriction bearing as claimed in claim 1, wherein the at least one bearing part has applied to it a logical electronic circuit comprising semiconductor structures on the basis of conventional semiconductor technology, and further structures belonging to this circuit are comprised of at least one electrically conducting or semiconducting organic material and are printed onto the bearing part.

18. The antifriction bearing as claimed in claim 1, further comprising electrically conducting connections between at least one of the strip conductors and the electronic components arranged in different planes wherein the planes are aligned substantially perpendicular to the longitudinal extent of the strip conductors, and are formed by an electrically conducting or semiconducting organic material.

19. The antifriction bearing as claimed in claim 1, further comprising an insulating layer comprised of an electrically insulating material and formed between the surface of the at least one bearing part and the strip conductors, electronic components or sensors.

20. The antifriction bearing as claimed in claim 1, further comprising an optically operating transmitting device comprised of an electrically conducting or semiconducting organic material and operable for transmission of sensor signals or quantities derived from the sensor signals from one of the bearing parts to an element located outside this bearing.

21. The antifriction bearing as claimed in claim 1, further comprising an inductive power supply to the electronic components in the antifriction bearing comprising an excitation coil, located outside the bearing, and a secondary coil, fastened to the bearing and excitable by the excitation coil.

22. A method for producing an antifriction bearing including
   bearing parts;
   sensors for recording physical quantities acting on the bearing; and
   electronic components for at least one of evaluating and transmitting output signals from the sensors or characteristic values derived from the signals to electrical or electronic devices located outside the bearing;
   the sensors and electronic components being arranged on at least one of the bearing parts, for forming at least one of a measurement data recording system and a measurement data processing system;
   the method comprising:
   applying and building up the sensors, and electronic components on a surface of at least one part of the antifriction bearing using at least one electrically conducting or semiconducting organic material or a precursor thereof;
   wherein strip conductors are also arranged on at least one of the bearing parts; the strip conductors being applied and built up on the surface of the at least one part of the bearing using at least one electrically conducting or semiconducting organic material or a precursor thereof;
   the method further comprising arranging the sensors, strip conductors and electronic components in more than one plane with an insulator interposed, electrically connecting the sensors, strip conductors and electronic components to one another by an electrically conducting organic material or semiconducting organic material, wherein the electrically conducting or semiconducting organic material is aligned substantially perpendicular to the longitudinal extent of the strip conductors or the electronic components.

23. The method as claimed in claim 22, further comprising printing the electrically conducting or semiconducting organic material or the precursor thereof onto the surface of the at least one part of the antifriction bearing.

24. The method as claimed in claim 23, wherein the sensors, strip conductors and electronic components are thermal transfer printed to transfer them from an intermediate carrier either to a carrier substrate for the electronics, or directly to a bearing part.

25. The method as claimed in claim 23, wherein the applied electronic components comprise a logical electronic circuit comprising semiconductor structures which are applied to the at least one bearing part by conventional semiconductor technology, and further electronic structures of the logical electronic circuit, which are comprised of an electrically conducting or semiconducting organic material, are applied by being printed onto the bearing part.

26. The method as claimed in claim 25, further comprising forming the electronic circuit and individual sensors from the electrically conducting or semiconducting organic material or the precursor thereof and applying the formed circuit and sensors to a flexible film, subsequently singulating the circuit and sensors and then fastening the circuit and sensors on the at least one bearing part in a predetermined configuration and electrically connecting them to one another.

27. The method as claimed in claim 23, wherein
   the sensors, strip conductors and electronic components are built up on the surface of the at least one bearing part layer by layer by screen printing, indirect gravure printing, flexographic printing or liquid jet printing, and the printing using a liquid including an electrically conducting or semiconducting organic material dissolved or dispersed in the liquid.

28. The method as claimed in claim 22, wherein
   the applying and building up of the sensors, strip conductors and electronic components is by surface-area application of the electrically conducting or semiconducting organic material or the precursor thereof in dissolved or dispersed form onto the bearing parts and subsequently laterally structuring the applied material by direct lithography or laser ablation.

29. The method as claimed in claim 22, further comprising building up the sensors, strip conductors and electronic components on the bearing part by laser induced thermal imaging, wherein the organic material, which was applied to a carrier film and in a solid state, is transferred from the film to the bearing part in a laterally structured form.

30. The method as claimed in claim 22, wherein, before the sensors, strip conductors and electronic components are applied and built up, applying an insulating layer made from organic or inorganic material on the surface of the at least one bearing part.

* * * * *